(12) United States Patent
Öttinger et al.

(10) Patent No.: US 11,795,112 B2
(45) Date of Patent: Oct. 24, 2023

(54) 3-D PRINTING OF A CERAMIC COMPONENT

(71) Applicant: SGL CARBON SE, Wiesbaden (DE)

(72) Inventors: Oswin Öttinger, Meitingen (DE); Dominik Rivola, Meitingen (DE); Stefan Klein, Meitingen (DE); Andreas Kienzle, Meitingen (DE); Ingrid Krätschmer, Biberbach (DE)

(73) Assignee: SGL CARBON SE, Wiesbaden (DE)

( * ) Notice: Subject to any disclaimer, the term of this patent is extended or adjusted under 35 U.S.C. 154(b) by 364 days.

(21) Appl. No.: 15/778,365

(22) PCT Filed: Nov. 24, 2016

(86) PCT No.: PCT/EP2016/078735
§ 371 (c)(1),
(2) Date: May 23, 2018

(87) PCT Pub. No.: WO2017/089494
PCT Pub. Date: Jun. 1, 2017

(65) Prior Publication Data
US 2018/0339946 A1  Nov. 29, 2018

(30) Foreign Application Priority Data
Nov. 24, 2015 (DE) .................... 10 2015 223 236.0

(51) Int. Cl.
| C04B 35/565 | (2006.01) |
| C04B 35/532 | (2006.01) |
| B28B 1/00 | (2006.01) |
| B33Y 10/00 | (2015.01) |
| B32B 18/00 | (2006.01) |
| C04B 35/626 | (2006.01) |
| B29C 64/165 | (2017.01) |
| C04B 35/573 | (2006.01) |
| C04B 35/515 | (2006.01) |

(Continued)

(52) U.S. Cl.
CPC ............ *C04B 35/565* (2013.01); *B28B 1/001* (2013.01); *B29C 64/165* (2017.08); *B32B 18/00* (2013.01); *B33Y 10/00* (2014.12); *B33Y 70/10* (2020.01); *C04B 35/515* (2013.01); *C04B 35/532* (2013.01); *C04B 35/573* (2013.01); *C04B 35/62695* (2013.01); *C04B 35/62886* (2013.01); *C04B 35/63488* (2013.01); *C04B 35/657* (2013.01); *B33Y 80/00* (2014.12); *C04B 2235/3427* (2013.01); *C04B 2235/422* (2013.01); *C04B 2235/428* (2013.01); *C04B 2235/483* (2013.01); *C04B 2235/5296* (2013.01); *C04B 2235/5427* (2013.01); *C04B 2235/5436* (2013.01); *C04B 2235/5463* (2013.01); *C04B 2235/608* (2013.01); *C04B 2235/6026* (2013.01); *C04B 2235/616* (2013.01); *C04B 2235/6581* (2013.01); *C04B 2235/77* (2013.01); *C04B 2235/85* (2013.01); *C04B 2235/96* (2013.01); *C04B 2235/9607* (2013.01); *C04B 2237/363* (2013.01); *C04B 2237/365* (2013.01); *C04B 2237/58* (2013.01); *C04B 2237/61* (2013.01); *C04B 2237/62* (2013.01)

(58) Field of Classification Search
CPC .... C04B 2235/5296; C04B 2235/6026; C04B 2235/5463
See application file for complete search history.

(56) References Cited

U.S. PATENT DOCUMENTS 4,154,787 A * 5/1979 Brown .................. C04B 35/573
264/101
4,957,811 A * 9/1990 Benker .................. C04B 35/573
423/345

(Continued)

FOREIGN PATENT DOCUMENTS

| DE | 2947005 A1 * | 6/1981 | ............... C07C 2/82 |
| DE | 19730742 A1 | 1/1999 | |

(Continued)

OTHER PUBLICATIONS

Mei, Hui, et al. "Strength and Toughness Improvement in a C/SiC Composite Reinforced with Slurry-Prone SiC Whiskers." Ceramics International, vol. 40, No. 9, 2014, pp. 14099-14104., doi:10.1016/j.ceramint.201 Accessed Feb. 21, 2020 (Year: 2014).*

(Continued)

*Primary Examiner* — Alison L Hindenlang
*Assistant Examiner* — Andrés E. Behrens, Jr.
(74) *Attorney, Agent, or Firm* — Maier & Maier, PLLC

(57) ABSTRACT

A method for producing the component, and to the use of the component. The method for producing a three-dimensional, ceramic component containing silicon carbide, by a) providing a powdery composition having a grain size (d50) between 3 microns and 500 microns and comprising at least 50 wt % of coke, b) providing a liquid binder, c) depositing a layer of the material provided in a) in a planar manner and locally depositing drops of the material provided in b) onto said layer and repeating step c), the local depositing of the drops in the subsequent repetitions of the step is adapted in accordance with the desired shape of the component to be produced, d) at least partially curing or drying the binder and obtaining a green body having the desired shape of the component, e) carbonising the green body, and f) siliconising the carbonised green body by infiltration with liquid silicon.

22 Claims, No Drawings

(51) Int. Cl.
*B33Y 70/10* (2020.01)
*C04B 35/628* (2006.01)
*C04B 35/634* (2006.01)
*C04B 35/657* (2006.01)
*B33Y 80/00* (2015.01)

(56) References Cited

U.S. PATENT DOCUMENTS

| | | | | |
|---|---|---|---|---|
| 6,995,103 | B2* | 2/2006 | Aghajanian | C04B 35/563 109/49.5 |
| 9,695,089 | B2* | 7/2017 | Lynen | B32B 18/00 |
| 9,975,814 | B2* | 5/2018 | Damjanovic | F41H 5/0428 |
| 10,137,637 | B2* | 11/2018 | Goto | B33Y 10/00 |
| 2002/0006506 | A1* | 1/2002 | Hanzawa | C04B 35/573 428/293.1 |
| 2002/0195746 | A1* | 12/2002 | Hull | B29C 64/124 425/375 |
| 2004/0130055 | A1* | 7/2004 | Beaman | C04B 35/64 264/161 |
| 2010/0145469 | A1* | 6/2010 | Barralet | C04B 35/447 427/2.24 |
| 2010/0279007 | A1* | 11/2010 | Briselden | C04B 35/6269 427/243 |
| 2014/0044979 | A1* | 2/2014 | Polster | C04B 35/522 428/448 |
| 2021/0163368 | A1* | 6/2021 | Ottinger | C04B 41/4515 |

FOREIGN PATENT DOCUMENTS

| | | | |
|---|---|---|---|
| DE | 19809657 A1 | 9/1999 | |
| DE | 102009048424 A1 | 4/2011 | |
| DE | 102011007815 A1 | 10/2012 | |
| EP | 2998282 A1 | 3/2016 | |
| WO | WO-2003/093194 * | 11/2003 | B82Y 30/00 |
| WO | 2015/100085 A2 | 7/2015 | |

OTHER PUBLICATIONS

"Flexural Strength." Wikipedia, the Free Encyclopedia, Oct. 15, 2015, web.archive.org/web/20151015085726/en.wikipedia.org/wiki/Flexural_strength. (Year: 2015).*
"Toughness." Wikipedia, the Free Encyclopedia, Nov. 9, 2015, web.archive.org/web/20151109205508/en.wikipedia.org/wiki/Toughness. (Year: 2015).*
Asgharzadeh, H., and N. Ehsani. "Densification and Microstructural Evolutions during Reaction Sintering of SiC—Si—C Powder Compacts." ISRN Materials Science, vol. 2011, 2011, pp. 1-7., doi:10.5402/2011/763296. (Year: 2011).*
Google Translation of Abstract & Espacenet Translation of Specifications. "DE2947005A1—Quench Oil for Use in High-Temp. Pyrolysis for Acetylene—Made by Reaction in Hot Coke Bed of Heavy Oils, E.g. from Ethylene Crackers." Nov. 22, 1979, patents.google.com/patent/DE2947005A1/en?oq=DE-2%2C947%2C005.*
"Carbon Black." Wikipedia, Wikimedia Foundation, Nov. 5, 2015, web.archive.org/web/20151105133412/en.wikipedia.org/wiki/Carbon_black. (Year: 2015).*
"Cokes." European Carbon and Graphite Association, Dec. 10, 2005, https://www.carbonandgraphite.org/index.php/raw-materials/cokes. (Year: 2005).*
"Ink Jet Printing Techniques" Efunda, Oct. 26, 2015, web.archive.org/web/20151026045450/https://www.efunda.com/processes/rapid_prototyping/inkjet.cfm. (Year: 2015).*
"Rapid Prototyping: Ink Jet." Wikipedia, web.archive.org/web/20151026045450/https://www.efunda.com/processes/rapid_prototyping/inkjet.cfm. Accessed Oct. 12, 2015. (Year: 2015).*
International Search Report dated Feb. 22, 2017 of corresponding International Application No. PCT/EP2016/078735; 8 pgs.
B.Y. Stevinson et al., "Support-Free Infiltration of Selective Laser Sintered (SLS) Silicon Carbide Preforms", Aug. 14, 2006, pp. 359-366, http://sffsymposium.engr.utexas.edu/Manuscripts/2006/2006-33-Stevinson.pdf.
Jooho Moon et al., "Fabrication of functionally graded reaction infiltrated SiC—Si composite by three-dimensional printing (3DP™) process", Materials Science and Engineering, Jan. 1, 2001, A vol. 298, pp. 110-119.

* cited by examiner

3-D PRINTING OF A CERAMIC COMPONENT

FIELD

The present invention relates to a three-dimensional ceramic component containing silicon carbide, to a method for producing the component, and to the use of the component.

BACKGROUND

Silicon carbide ceramic is distinguished in particular by its hardness, wear resistance, chemical stability and temperature resistance. One way of producing this material is to compress carbon-containing fillers together with a binder so as to form, following curing, a green body. The green body is then carbonised, or pyrolised, at a high temperature so as to form a carbon body, which is lastly infiltrated with liquid silicon, the carbon reacting with silicon and forming SiC. Typically, by means of methods of this kind, a composite material is obtained which contains unreacted carbon and free silicon, in addition to SiC. This material is therefore referred to as a C/Si/SiC composite material.

Mechanically processing silicon carbide ceramic is very difficult on account of the hardness of the material. More complex structures made of silicon carbide ceramic are therefore achieved by joining individual carbon parts prior to siliconisation so as to form an overall component, there also being limits to the complexity of the components to be produced in the case of this method. A method of this kind is described in DE 10 2011 007 815 A1, for example. Another drawback is that the joints may lead to a lack of uniformity in the material of the final component.

SUMMARY

The object of the present invention is therefore to provide an isotropic, ceramic component which is free of joints, can be produced to a practically unlimited level of geometric complexity, and is cheap and easy to produce.

Within the scope of the present invention, it has been found that the green body intended for carbonisation and siliconisation can be produced by means of a 3D printing method, and that said green body can be infiltrated with liquid silicon to an excellent degree, in order to obtain an isotropic, ceramic component. The last-mentioned step works particularly well under certain conditions, which will be described in detail further below, such that liquid silicon infiltrates the carbonised green body by itself on account of the capillary forces.

The method for producing a three-dimensional ceramic component of this kind containing silicon carbide comprises the following steps:
a) providing a powdered composition having a grain size (d50) of between 3 µm and 500 µm, comprising at least 50 wt. % coke,
b) providing a liquid binder,
c) planarly depositing a layer of the material provided in a) and locally depositing droplets of the material provided in b) to said layer, and repeating step c), wherein the step of locally depositing the droplets in subsequent repetitions of said step is adjusted according to the desired shape of the component to be produced,
d) at least partially curing or drying the binder and obtaining a green body having the desired shape of the component,
e) carbonising the green body, and
f) siliconising the carbonised green body by means of infiltration with liquid silicon, wherein the green body, while above the melting temperature of silicon and substantially above the surface of a silicon bath, becomes saturated with silicon by means of capillary forces.

The powdered composition according to the invention may be either a powder consisting of primary particles or a granulate.

The term "d50" means that 50% of the particles are smaller than the indicated value. The d50 value was determined using the laser granulometry method (ISO 13320), a measurement device from Sympatec GmbH being used together with associated analysis software.

The obtaining of a green body having the desired shape of the component within the scope of the present invention is understood to mean the following. Straight after the binder is cured or dried, the green body is still surrounded by a powder bed consisting of loose particles of the powdered composition. The green body therefore has to be removed from the powder bed or separated from the loose non-solidified particles. In the literature on 3-D printing, this is also referred to as "unpacking" the printed component. The step of unpacking the green body may be followed by a step of (fine) cleaning said green body in order to remove unseparated particle residue. The unpacking can take place, e.g. by sucking the loose particles, using a powerful suction device. However, the manner of unpacking is not particularly limited, and any known method may be used.

The type of the used coke is not particularly limited. Hard coal tar pitch coke, petrol coke, acetylene coke, flexi coke, fluid coke and shot coke may be used as starting materials, for example. Hard coal tar pitch coke is produced as follows: When metallurgical coke is produced from hard coal, hard coal tar is produced as a biproduct. Said tar is distilled, and the residue is recoked. Lastly, the obtained pitch coke is ground. Petrol coke is obtained during atmospheric and vacuum distillation of petroleum. Following the "delayed coking" process, green coke is formed as a residue. Said residue is typically calcined at 1,100-1,300° C., and lastly the obtained petrol coke is ground. Fluid coke and flexi coke are also based on the processing of petroleum. However, in this case, instead of the delayed coking process, "fluid coking" or "flexi coking" is used, both of which typically take place in a continuous fluidised bed, which leads to largely spherical particles. During acetylene production, which is described in detail in DE 29 47 005 A1, acetylene coke accumulates as a waste product, which is initially green, i.e. contains volatile constituents.

It is also possible to select carbonised ion-exchange resin beads as the used coke. The advantage of this starting material is its practically perfectly spherical shape. The advantages of a coke shape which is as round as possible are described further below.

The coke is preferably selected from the group consisting of acetylene coke, flexi coke, fluid coke, shot coke and coke consisting of ion-exchange resin beads.

Acetylene coke, flexi coke and fluid coke can be used as green coke, but also in calcined form. These lead to a frictionless 3D printing process and, on account of the round particles, to excellent flowability and a high breaking strength of the ceramic component. In this respect, acetylene coke is most preferred as it has few impurities and a particularly spherical shape. Acetylene coke is therefore also most preferred because this type of coke is particularly pure. Its ash value is approximately 0.01%, and the metal impurities, such as Na, Ni, Fe and V, are typically consistently well below 50 ppm. However, flexi coke has an ash value in the 1% range. The above-mentioned metal impurities are in the range of from several 100 ppm to more than 1,000 ppm. Many of these impurities have a catalysing effect on the oxidation behaviour of the material. Impurities, such as nickel oxide, in highly impure cokes having contents of more than 0.1% are even graded as a category 1A carcinogens, meaning that the handling, processability and use of highly impure cokes is considerably limited. Furthermore, the moulding dies made of acetylene coke according to the invention have a particularly high green density and a higher breaking strength than those made of flexi coke, for example. The reason for this is possibly that acetylene coke has an onion-like layer structure. The embodiment that is most preferred according to the invention is therefore a moulding die according to the invention in which the carbon particles contained therein comprise acetylene coke or, preferably, consist of acetylene coke. Shot coke is an isotropic type of coke of which the particles tend to be spherical and of which some have an onion-like layer structure (see: Paul J. Ellis, "Shot Coke", *Light Metals,* 1996, pages 477-484).

Coke is referred to as green coke if it still contains volatile constituents. There are practically none of these volatile constituents in calcined coke, or carbonised coke. Within the scope of the present invention, the terms carbonisation, calcination and pyrolysis are considered to be synonymous.

The powdered composition according to a) preferably has a grain size (d50) of between 50 µm and 350 µm, more preferably between 100 µm and 250 µm. In the case of smaller grain sizes, the method is more expensive as more layers have to be accordingly applied. Conversely, coarser grain sizes lead to accordingly larger carbon regions in the component, which has a negative effect on the mechanical properties. In order to achieve these grain sizes, the coke can be ground. However, in the case of the preferred types of coke having a relatively round shape, the coke is preferably not ground as the advantageously round shape would otherwise be destroyed. In this case, the desired grain size, or the desired grain size range, is preferably obtained by sieving and selecting the suitable sieve fraction.

The powdered composition according to step a) is preferably a granulate. This means that the particles consist of agglomerated primary particles; therefore, primary particles are fine starting particles, e.g. for producing granulates. The use of granulates, in the case of very small primary particles, for example in the range of d50=3-50 µm is particularly preferred. The 3D printing process is more efficient on account of the thus obtained larger particles (agglomerates). By means of granulation, the grain size distribution can also be reduced. Lastly, a round grain shape can be obtained by granulating smaller non-round particles, such as rods or flakes. This leads to advantageous handling of the powder (less dust dispersion), improved stability of the green body, a porosity of the green body which can be selectively adjusted and is suitable for the siliconisation, and more efficient 3D printing.

The powdered composition preferably contains at least 80%, more preferably at least 90%, and most preferably at least 100% coke. This leads to a lower coefficient of thermal expansion of the component according to the invention and to an overall lighter component, on account of its lower density.

Within the scope of the invention, it is possible for a liquid activator, such as a liquid sulfuric acid activator, to be added to the coke. By using an activator, the curing time and the necessary temperature for curing the binder are reduced. The formation of dust of the powdered composition is also reduced. The amount of activator is advantageously from 0.05 wt. % to 3 wt. %, more preferably from 0.1 wt. % to 1 wt. %, based on the total weight of coke and activator. If more than 3 wt. % is used, based on the total weight of activator and coke, the powdered composition sticks together and flowability is reduced. If less than 0.05 wt. % is used, based on the total weight of coke and activator, the amount of activator which can react with the binder is too small to achieve the desired above-mentioned advantages.

The selection of the binder step b) is not particularly limited. Suitable binders are, for example, based on phenol resin, furan resin, polyimides, cellulose, starch, sugar, silicates, silicon-containing polymers, pitch, polyacrylonitrile (PAN) or mixtures thereof. Solutions of said binders are also included herein. In principle, the nature of the binders should be such that, following carbonisation, it is possible to obtain stable bodies which withstand the temperature during siliconisation and being handled when transferred to the siliconisation device. The binder should have either a sufficiently high carbon yield or a sufficiently high Si-containing inorganic yield when Si-organic binders are used following pyrolysis. When selecting thermoplastic binders, such as pitch, it may be necessary to carbonise the entire powder bed in order to break said powder bed down and thus eventually cross-link it. The same applies to PAN. In this process, the powder bed without an addition of binder acts as a support for the component while the thermoplastic binder, such as pitch or PAN, is being carbonised. In addition, the powder bed acts as oxidation protection for the printed green body, or carbonised body, meaning that carbonisation is possible in the open air.

According to a preferred embodiment of the present invention, the binder in step b) comprises phenol resin, furan resin, polyimides or mixtures thereof.

These may also be in the form of a solution. These binders are resins and polymers having a comparatively high carbon yield. Said binders are part of the class of binders which can be converted to a non-meltable binder system by means of curing and are largely converted to SiC during siliconisation. On account of the high carbon yield of said binders, generally not all the carbon is converted to SiC during siliconisation, and this leads to carbon inclusion and therefore an overall lighter component. Furthermore, the high carbon yield leads to the content of free silicon in the component being accordingly lower, thus leading to improved chemical stability. Within the scope of the present invention, "free silicon", along with "free carbon", mentioned below, is understood to mean the elements in their pure form, which have not chemically bonded, or have only chemically bonded to themselves.

According to another preferred embodiment of the present invention, the binder in step b) comprises cellulose, starch, sugar or mixtures thereof. These are preferably used as a solution. Said binders only have to be dried in step d) (low cost), and the carbon residue formed during carbonisation is converted to SiC to an ideal degree, i.e. completely, during siliconisation.

According to another preferred embodiment of the present invention, the binder in step b) comprises silicates, silicon-containing polymers or mixtures thereof. These may also be in the form of a solution. Said binders also have to be cured. During carbonisation, they form SiC by themselves. Furthermore, the wetting with liquid Si is better than for carbon, which makes the siliconisation step easier.

The proportion of binder in the green body following step d) is preferably in the range of from 2 to 35 wt. %, more preferably in the range of from 3 to 25 wt. %, and most preferably in the range of from 3 to 10 wt. %, based on the total weight of the green body. In the case of optional supplementary impregnation, as is described further below, the proportions mentioned in this paragraph relate to those before the supplementary impregnation. This binder content ensures a stability of the green body that is suitable for the subsequent siliconisation.

According to a preferred embodiment of the present invention, following step d) and before step e), the green body is impregnated with a binder, preferably with the same binder as that from step b), and method step d) is subsequently repeated. The thus achieved increase in density of the green body before the siliconisation results in a lower Si content in the component, a component thus being formed which, thermally and chemically speaking, is more stable. Depending on the selection of the binder, compact carbon green bodies (for example, in the case of phenol resin) or loose carbon skeletons (for example, if celluloses are used as a binder) are produced. The compact green bodies are only converted to SiC at the surface, and the loose carbon backbones are almost completely converted to SiC, this of course referring only to the carbon that results from the binder, or binders, following the carbonisation.

The d99 value of the grain size distribution of the powdered composition preferably corresponds to at most 4 times, preferably at most 3 times, preferably at most 2.5 times the value of the d50 value. This results in fewer coarse grains and a narrower grain size distribution, which facilitates reliable printing and trouble-free powder application. The term "d99" means that 99% of the particles are smaller than the indicated value. In order to determine the d99 value, the same measurement method is used as for determining the d50 value.

The powdered composition preferably additionally contains a powder that is selected from the group consisting of graphite powder, SiC powder, carbon powder, metal carbides, ground carbon fibres and cellulose powder. Carbon powder includes coke powder, but also soot, activated carbon, glassy carbon and soot spheres. Soot spheres can be obtained by mixing soot and pitch and carbonising and grinding the mixture. In the case of glassy carbon powder, an overall lighter component is obtained as a result of the lower density of the component.

The additional powder is preferably a granulate. This facilitates faster, more reliable and more efficient 3D printing because a coarser powder can be obtained from fine primary particles, which powder is also practically spherical. Any graphite powder used is preferably in the form of a granulate as the naturally non-round graphite flakes can be combined by means of granulation to form almost spherical agglomerates. The additional powder therefore preferably comprises what is referred to as spherical graphite, which consists of granulated natural graphite.

The particles of the powdered composition in the grain size range of the d(50) value preferably have, on average, a shape factor (particle width/particle length) of at least 0.5, more preferably at least 0.6, even more preferably at least 0.7, and most preferably at least 0.8. The shape factor is understood to mean the ratio of particle width to particle length. The grain size range of the d(50) value is understood to mean the range of d(50)+/−10%. The shape factor was determined, as per ISO 13322-2, by means of "Camsizer" device from Retsch Technology. In this process, the width and length of the particles are determined by means of a camera and an image analysis system and compared to form a ratio. In the case of particularly fine powder, the shape factor may alternatively be determined on the basis of micrographs together with associated image analysis.

The particles of the powdered composition in a fraction having a grain size of between 200 and 250 μm have, on average, a shape factor of at least 0.5, more preferably at least 0.6, even more preferably at least 0.7, and most preferably at least 0.8. The advantage of practically round particles is reliable 3D printing, trouble-free powder application and the lower tendency for cracks to appear during thermomechanical loading. Furthermore, it has been found that, the rounder the particles, the better, i.e. higher, the work of fracture and the elongation at break of the corresponding ceramic components.

Carbonisation is understood to mean the thermal conversion of the binder in the green body to carbon by heating to temperatures of more than 500° C.

In principle, carbon green bodies can be siliconised in a protective gas atmosphere (e.g. Ar or He), at overpressure, at normal pressure or in a vacuum. According to the invention, in order for complex, sophisticated structures, such as undercuts, cavities and cooling channels, to be produced, it is necessary that the liquid silicon be able to infiltrate the green body by itself, i.e. purely by means of capillary forces. Within the scope of the present invention, it has surprisingly been found that green bodies produced according to the invention have precisely this desired property, i.e. whereby the pore system of the carbonised green body can be formed by means of 3D printing such that, by means of capillary forces alone, a practically pore-free component is completely infiltrated with silicon. Furthermore, in the cooling process following infiltration, the liquid silicon does not flow back out, in addition to it typically being pushed out as a result of the sharp change in density of silicon. The green body is infiltrated with liquid silicon particularly effectively in a vacuum as the carbon is thus more effectively wetted by silicon and the suction behaviour of the green body is improved. Furthermore, siliconisation in a vacuum can be carried out at a lower temperature, said temperature of course having to be above the melting temperature of silicon. The method step f) according to the invention, namely the siliconisation, therefore preferably takes place in a vacuum. Within the scope of the present invention, the liquid silicon referred to in this connection also comprises silicon alloys having a proportion of silicon of at least 50 wt. %. However, pure silicon is preferably used.

In the method according to the invention, the steps e) and f), namely the carbonisation and the subsequent siliconisation, may take place in a single method step in practice. This is because, during the siliconisation, the green body carbonises, or pyrolises, when it is heated to the siliconisation temperature, or "in situ." A procedure of this kind is therefore explicitly covered by the present invention. Merely for the purpose of preventing any misunderstanding, it is therefore clarified at this juncture that, in the context of siliconisation, the term "green body" may be intended to mean both the non-carbonised green body following step d) and the carbonised green body following step e).

During the siliconisation (step f), the green body to be siliconised is preferably positioned on wicks which project from a bath of the silicon melt. In a similar manner to the green body itself, the wicks are able to guide the liquid silicon through the porous structure thereof by means of capillary forces. In the process, the green body itself is not immersed in the silicon bath, but is rather positioned above said bath. Once the siliconisation is complete and following cooling to room temperature, the wick is connected to the component by the solidified silicon and therefore has to be removed mechanically. In order to simplify the method according to the invention even further, the wicks are preferably already provided as part of the green body, i.e. are "printed thereon" (step c). It is thus possible to easily place the green body, together with the downward-facing wicks, into the container provided for the silicon bath. Once siliconisation is complete and following cooling, the wicks are mechanically removed as before.

Another subject of the present invention is a three-dimensional, ceramic component which is produced according to the method according to the invention. Said component preferably contains from 20 to 75 wt. % SiC, from 10 to 45 wt. % free silicon and from 10 to 60 wt. % free carbon. If the proportion of silicon is too high (greater than 45 wt. %), the chemical stability and the temperature stability drop. In theory, a silicon content which is as small as possible would be desirable; however, by means of the method according to the invention, a silicon content of less than 10 wt. % cannot be achieved in practice. If the carbon content is too high (greater than 60 wt. %), the risk of the material oxidising increases significantly. The carbon content should also be as low as possible for reasons of stability of the component. However, a higher carbon content again leads to a lower density of the material and thus to a lighter component.

The component produced according to the invention is distinguished in particular in that the carbon which is contained therein and has thus not been converted to SiC is completely surrounded by SiC, meaning that there is no connected carbon network. This is highly advantageous in terms of oxidisation stability. While, in certain applications, it is usual to provide the corresponding ceramic component with additional oxidation protection, this is not absolutely necessary in the case of the component according to the invention. The present invention therefore relates to a three-dimensional, ceramic component containing as constituents silicon carbide, which contains from 20 to 75 wt. % SiC, from 10 to 45 wt. % free silicon and from 10 to 60 wt. % free carbon, the carbon being completely surrounded by SiC.

The carbon is preferably in particulate form, and substantially all carbon particles are each completely surrounded by SiC. This results in particularly high oxidation stability of the component. The integral carbon regions in the component extend no further than the dimensions of the coke particles used to produce the ceramic component. The features of the coke particles used in step a), as are described in connection with the method according to the invention, also influence the component according to the invention and therefore can of course be combined with the features of the component according to the invention. Furthermore, all other features described in connection with the method according to the invention can of course also be combined with the features of the component according to the invention.

The component according to the invention preferably has a density of at most 3.0 g/cm$^3$, particularly preferably at most 2.5 g/cm$^3$. As a result, said component is particularly light in comparison with known SiC ceramics having comparable oxidation stability.

The component according to the invention preferably has a modulus of elasticity of at most 300 GPa, particularly preferably at most 100 GPa, and most preferably at most 50 GPa. The modulus of elasticity was determined from the starting linear gradient of the bending curve from the three-point bending test of the samples for determining the bending strength. The low modulus of elasticity means that the material is less brittle and is thus in turn more resistant to thermal shock than SiC ceramics having a higher modulus of elasticity. Lower moduli of elasticity can be achieved by a higher carbon content.

The component according to the invention preferably has a strength of at least 40 MPa and is thus stable enough even for most mechanically loaded components. The strength was determined in accordance with the three-point bending method with reference to DIN 51902.

The component according to the invention preferably has a coefficient of thermal expansion of at most $3.5 \times 10^{-6}$ K$^{-1}$ at between room temperature and 200° C., as measured with reference to DIN 51909. Said component is therefore distinguished by high dimensional stability at higher temperatures. High thermal shock resistance is also achieved.

The component according to the invention preferably has heat conductivity of at least 30 W/mK, preferably at least 40 W/mK, the heat conductivity being determined with reference to DIN 51908. In this respect, high thermal shock resistance is achieved. High thermal conductivities are achieved by an increased SiC-content.

The component according to the invention preferably has a work of fracture of at least 150 Nmm, preferably at least 200 Nmm, and most preferably at least 300 Nmm. The work of fracture was determined from the area of the bending deformation curve of the three-point bending method. Components having a work of fracture of more than 300 Nmm can be obtained in particular using round types of coke, such as acetylene coke.

The component according to the invention preferably has an elongation at break of at least 0.10%, preferably at least 0.15%, and most preferably at least 0.20%. Components having an elongation at break of more than 0.20% can be obtained in particular using round types of coke, such as acetylene coke.

The component according to the invention preferably comprises cavities, cooling channels and/or undercuts and consists overall of a microstructure of the constituents which is uniform or which gradually changes according to the desired material properties of the component. This means that, in contrast with known SiC ceramics, there are no sharp changes in the microstructure, or the composition, caused for example by a joint, which changes often lead to localised weakening of the component. The mentioned gradual transitions can be achieved, for example, by a variation in the amount of binder applied in step c) (for example, the number of droplets deposited per unit area). A variation in the grain size, shape and type of the used coke is also possible, this leading to an increase in the complexity of the process.

The three-dimensional, ceramic component according to the invention is distinguished in particular by its high chemical and mechanical stability and wear resistance. Said component is therefore particularly suitable for being used in pumps, in particular as a pump impeller and a pump housing for the chemical industry, as burner nozzles, burner inserts, lining burner walls, electrical heating elements and load-bearing structures in high-temperature furnaces, in particular on account of the high thermal shock resistance, and as a separator wheel for milling, intended for separating mixtures of particles of varying grain size. A further aspect of the present invention is therefore the use of the three-dimensional, ceramic component according to the invention in pumps, in particular as a pump impeller and pump housing in the chemical industry, as burner nozzles, burner inserts, lining for burner walls, electrical heating elements and load-bearing structures in high-temperature furnaces, and as a separator wheel. For these uses, in the method according to the invention, acetylene coke, fluid coke, flexi coke, carbonised ion-exchange resin beads or a granulate consisting of different types of coke is preferably used as the main constituent of the powdered composition in step a), because the approximately spherical shape of the coke particles leads to advantageous properties for this use. The three-dimensional, ceramic component according to the invention is distinguished in particular by its high chemical stability and heat conductivity and high thermal shock resistance. Said component is therefore particularly suitable for being used as a heat exchanger or element for heat exchangers. A further aspect of the present invention is therefore the use of the three-dimensional, ceramic component according to the invention as a heat exchanger or element for heat exchangers.

The three-dimensional, ceramic component according to the invention is distinguished in particular by its high mechanical hardness and wear resistance. Said component is therefore particularly suitable for being used as a mechanically loaded component, for example as a sliding bearing, a rotary seal, a gear, a piston and piston sleeves. A further aspect of the present invention is therefore the use of the three-dimensional, ceramic component according to the invention as a mechanically loaded component, including a sliding bearing, a rotary seal, a gear, a piston and piston sleeves.

The use as a piston having undercuts in the combustion bowl or cooling channels is particularly preferred. These are not easy to produce using conventional methods, and it has surprisingly been found that the component according to the invention is highly suitable for this use.

The three-dimensional, ceramic component according to the invention is distinguished in particular by its high thermal shock resistance, high stability and temperature resistance, oxidation resistance and its low coefficient of thermal expansion. Said component is therefore particularly suitable for being used as a casting mould, for example in the metal-processing industry, and as a crucible. A further aspect of the present invention is therefore the use of the three-dimensional, ceramic component according to the invention as a casting mould and as a crucible.

The three-dimensional, ceramic component according to the invention is distinguished in particular by its high mechanical hardness. Within the scope of the present invention, it has been found that the properties of the component according to the invention are comparable to those of conventional ceramic materials for ballistics. Furthermore, the component can adopt practically any desired complex shapes. Said component is therefore particularly suitable for being used as a ballistic structure, in particular a structure of the kind which, in terms of the complexity its shape, goes beyond that of typical sheets and armour for ballistics. Individual pieces of body armour (e.g. breastplates) are particularly preferred. This is because, even in the case of a low number of units, corresponding armour can be produced quickly and easily. A body to be protected merely has to be scanned (e.g. by means of a laser), and a corresponding program automatically controls the 3D printer in order to produce the green body.

Furthermore, a significant advantage is that there are no joints in the component according to the invention, which joints are always present in ballistic components assembled from sheets. By means of the method according to the invention, geometric segmentation can be achieved, meaning that multi-hit capability of the overall component is made possible as the segmentation fulfils a crack-preventing function. For example, a relatively thin carrier plate having raised chessboard-like segments can be printed for this purpose. A single, monolithic component is thus obtained. Said component is multi-hit capable on account of the raised segments. If a projectile strikes one of the segments, said segment is destroyed, the energy of the projectile being absorbed. The remaining segments remain intact and can absorb further projectiles. The component according to the invention can adopt any passive structure known in ballistics. A further aspect of the present invention is therefore the use of the three-dimensional, ceramic component according to the invention as a ballistic structure.

The three-dimensional, ceramic component according to the invention is distinguished in particular by its high wear resistance. Within the scope of the present invention, it has also been found that said component has properties, such as the coefficient of friction, which are suitable for frictional applications. Said component is therefore particularly suitable for being used as a frictional body. Furthermore, as a result of the production method according to the invention, any desired complex structures can be produced. It is therefore possible to also produce frictional bodies having even more efficient cooling channels. For example, cooling liquid may flow through said cooling channels in order to simultaneously utilise the waste heat in addition to the cooling effect. A further aspect of the present invention is therefore the use of the three-dimensional, ceramic component according to the invention as a frictional body having cooling channels or as a frictional lining.

The three-dimensional, ceramic component according to the invention is distinguished in particular by its low coefficient of thermal expansion and its high specific stiffness as a result of the low density. Said component is therefore particularly suitable for being used as a precision component, for example as a satellite mirror carrier, as a measurement device, as a wafer support in the production of semiconductors and for optical benches. A further aspect of the present invention is therefore the use of the three-dimensional, ceramic component according to the invention as a precision component.

The three-dimensional, ceramic component according to the invention is distinguished in particular by its high oxidation stability on account of the carbon which, as is described above, is completely surrounded by SiC. Said component is therefore particularly suitable for being used as microreactors, macroreactors, pipe linings and branched pipe elements. On account of the method according to the invention, there are practically no limits to the complexity of the structures of these products. A further aspect of the present invention is therefore the use of the three-dimensional, ceramic component according to the invention as microreactors, macroreactors, pipe linings and branched pipe elements.

DETAILED DESCRIPTION

The present invention will be illustrated below on the basis of examples. Unless explicitly indicated below, any of the features mentioned in the examples can be combined with the subjects of the general description of the present application.

EXAMPLE 1

Calcined hard coal tar pitch coke was ground and, following grinding and sieving, had a grain size distribution of $d10=130$ μm, $d50=230$ μm and $d90=390$ μm and a shape factor of 0.69. 1 wt. % of a liquid sulfuric acid activator for phenol resin, based on the total weight of coke and activator, was first added to the coke, which was then processed by a 3D printing powder bed machine. In this process, a doctor blade unit deposits a thin layer of coke powder (approximately 0.3 mm in height) on a flat powder bed, and a type of inkjet printing unit prints an alcoholic phenol resin solution onto the coke bed according to the desired component geometry. The printing table is subsequently lowered by a degree equal to the layer thickness, a layer of coke is re-applied, and phenol resin is locally printed on again. By means of the repeated procedure, rectangular test specimens having the dimensions 168 mm (length)×22 mm (width)×22 mm (height) were constructed in this process. Once the complete "component" had been printed, the powder bed was introduced into a furnace that had been pre-heated to 140° C., and was kept there for approximately six hours. Even though reference is made to "component" even at this stage, it goes without saying that this is not yet intended to mean the finished component according to the invention. In this process, the phenol resin cures and forms a dimensionally stable green body. Following cooling, the excess coke powder was sucked away, and the green body of the component was removed.

Once the binder had cured, the density of the green body was 0.88 g/cm3. The density was determined geometrically (by weighing and determining the geometry). The green body had a proportion of resin of 5.5 wt. %, which was determined by carbonisation treatment. This process proceeded such that the carbon yield of the used cured resin constituent was determined in advance to be 58 wt. % by means of thermogravimetric analysis (TGA). On the basis of the loss in mass of the green body following the subsequent carbonisation at 900° C. in a protective gas atmosphere for one hour, it was possible to calculate the original proportion of resin in the green body.

The carbonised green body was subsequently impregnated with phenol resin and carbonised again at 900° C. This increased the density to 1.1 g/cm$^3$. Within the scope of the present invention, this procedure is referred to as supplementary densification.

The carbonised green body (example 1.1) having undergone supplementary densification and the carbonised green body not having undergone supplementary densification (example 1.2) were carbonised at 900° C. in a protective gas atmosphere for one hour and then placed in a siliconisation furnace, said green bodies being placed on wicks. The wicks are positioned in a Si powder bed. The bed itself is in a coated graphite crucible. The furnace is heated to approximately 1,600° C. in a vacuum. In the process, the silicon powder turns to a liquid, and the liquid silicon rises, by means of capillary forces alone, via the wicks into the 3D-printed green bodies, without additional gas or liquid pressure being applied. A portion of the carbon reacts with the liquid silicon and forms SiC. Once the furnace has cooled, the components are removed, and the wicks are mechanically removed. The components are not porous.

EXAMPLE 2

0.35 wt. % of the liquid activator according to example 1 was added to unground calcined acetylene coke having a particle size distribution of d10=117 µm, d50=190 µm and d90=285 µm and a shape factor of 0.82, which coke was then processed so as to form a green body in a similar manner to example 1.

The green body had a proportion of resin of 3.0 wt. %. The density of the green body was 0.98 g/cm$^3$ and was thus significantly higher than for the ground hard coal tar pitch coke from example 1. Furthermore, said green body had higher strength than the green body from example 1, and this made it easier to handle. It is therefore possible to dispense with the supplementary densification of said green body, thus reducing production costs.

Said green body was placed directly (without separate carbonisation beforehand) into a siliconisation furnace and siliconised as per example 1. The binder was therefore carbonised and silicionized in one step.

Analysis

The following table displays a number of physical and chemical properties of the produced ceramic test specimens:

|  | Example 1.1 (averages) | Example 1.2 (averages) | Example 2 (averages) |
| --- | --- | --- | --- |
| AD (g/cm$^3$) | 2.3 | 2.5 | 2.3 |
| ER (Ohmµm) | 26 | 16 | 19 |
| YM 3p (GPa) | 30 | 31 | 35 |
| FS 3p (MPa) | 58 | 62 | 65 |
| $\varepsilon_{max}$ (%) | 0.16 | 0.16 | 0.25 |
| $W_{Bruch}$ (Nmm) | 170 | 220 | 340 |
| CTE RT/200° C. (µm/(m * K)) | 2.8 | 3.0 | 3.2 |
| TC (W/(m * K)) | 52 | 60 | 51 |
| OP (%) | 0 | 0 | 0 |
| C (%) | 38 | 24 | 41 |
| Si (%) | 26 | 38 | 34 |
| SiC (%) | 36 | 38 | 25 |

AD (g/cm$^3$): density (geometric) with reference to ISO 12985-1

ER (Ohmµm): electrical resistance with reference to DIN 51911

YM 3p (GPa): modulus of elasticity (stiffness), determined from the three-point bending test FS 3p (MPa): three-point bending strength with reference to DIN 51902

$\varepsilon_{max}$ (%): elongation at break $W_{Bruch}$ (Nmm): work of fracture, determined from the area of the bending deformation curve from the three-point bending method CTE RT/200° C. (µm/(m*K)): coefficient of thermal expansion, measured between room temperature and 200° C. with reference to DIN 51909

TC (W/(m*K)): heat conductivity with reference to DIN 51908

OP (%): open porosity with reference to DIN 51918

Example 1.1: hard coal tar pitch coke, green body additionally impregnated with phenol resin, carbonised at 900° C., siliconised.

Example 1.2: hard coal tar pitch coke, green body not impregnated with phenol resin, but directly carbonised at 900° C., siliconised.

Example 2: acetylene coke, green body not impregnated with phenol resin, carbonised and siliconised in one step.

As shown by all the examples, the method according to the invention makes it possible to obtain ceramic components which are comparable to known C/Si/SiC materials in terms of strength (three-point bending strength). The strength and also the modulus of elasticity are, for example, comparable to those of carbon fibre-reinforced ceramic brake discs.

Furthermore, the modulus of elasticity is less than that of conventional SiC ceramics by a factor of 10, which results in significantly improved thermal shock resistance.

Furthermore, the coefficient of thermal expansion of approximately $3 \times 10^{-6}$ K$^{-1}$ is extremely low, which favours in particular thermal shock resistance and ensures high dimensional stability.

The heat conductivities of more than 50 W/mK are also comparable to a range of metal materials, and are thus high enough for heat exchanger applications. This also favours thermal shock resistance.

Furthermore, the components according to the invention have a relatively low density in comparison with conventional SiC ceramics and metals, which results in overall lighter components.

It is also surprising that the specific electrical resistance is in a value range which is typical for heating elements.

It is also surprising that the components according to the invention do not have an open porosity. They are therefore highly suitable for applications in oxidative atmospheres and for applications in chemical apparatus construction.

What the examples also surprisingly indicate is that the acetylene coke in example 2 leads to components having a lower SiC content, or a higher carbon content, than in examples 1.1 and 1.2, and this brings about a lower density. Micrographs of the components have shown that the cause of this is that a protective SiC layer forms around the coke spheres during siliconisation.

Furthermore, the strengths from example 2 are considerably higher than those from examples 1.1 and 1.2, because the rounder coke grain presumably has less of a crack-initiating function than less round coke grains. This property also has a positive effect on the comparably high work of fracture and high elongation at break.

Furthermore, the free Si content can be lowered by additionally impregnating the green body (example 1.1). This is advantageous as the silicon is the only constituent in the component that can still turn to a liquid, and this limits the use of the component at very high temperatures (>1,400° C.).

The invention claimed is:

1. A method for producing a three-dimensional, ceramic component containing silicon carbide, comprising:
   a) providing a powdered composition having particles of a grain size (d50) of between 3 μm and 500 μm and a shape factor (width/length) of at least 0.5 on average, the powdered composition comprising at least 80 wt. % coke,
   b) providing a liquid binder,
   c) three dimensionally printing by a step of planarly depositing a layer of the powdered composition provided in a) and followed by a step of locally depositing droplets of the binder provided in b) to said layer, and subsequently repeating the step of planarly depositing of a layer of the powdered composition provided in a) followed by the step of locally depositing of droplets of the binder to said layer to obtain a printed material, wherein the step of locally depositing the droplets in subsequent repetitions of said step is adjusted according to a desired shape of the three-dimensional, ceramic component to be produced from the printed material,
   d) at least partially curing or drying the binder of the printed material obtained from step c) to obtain a green body formed of the powdered composition and cured or dried binder, the green body being surrounded by a powder bed consisting of loose particles of the powdered composition, and unpacking the green body from the loose particles, thereby obtaining a green body having the desired shape of the three-dimensional, ceramic component,
   e) carbonising the green body obtained from step d) of the desired shape of the three-dimensional, ceramic component, and
   f) siliconising the carbonised green body obtained from step e) by means of infiltration with liquid silicon to obtain the three-dimensional, ceramic component, wherein the green body, while above the melting temperature of silicon and substantially above the surface of a silicon bath, becomes saturated with silicon by means of capillary forces.

2. The method according to claim 1, wherein the coke is selected from the group consisting of acetylene coke, flexi coke, fluid coke, shot coke and carbonised ion-exchange resin beads.

3. The method according to claim 1, wherein the powdered composition according to step a) is a granulate.

4. The method according to claim 1, wherein the binder in step b) comprises phenol resin, furan resin, polyimides or mixtures thereof.

5. The method according to claim 1, wherein the binder in step b) comprises cellulose, starch, sugar or mixtures thereof.

6. The method according to claim 1, wherein the binder in step b) comprises silicates, silicon-containing polymers or mixtures thereof.

7. The method according to claim 1, wherein the siliconising of the carbonised green body takes place in a vacuum.

8. A three-dimensional, ceramic component produced according to the method of claim 1, wherein the three-dimensional, ceramic component contains 20-75 wt. % SiC, 10-45 wt. % free silicon and 10-60 wt. % free carbon.

9. The three-dimensional, ceramic component according to claim 8, wherein the free carbon contained in the three-dimensional, ceramic component is completely surrounded by SiC.

10. The three-dimensional, ceramic component according to claim 9, wherein the carbon is in particulate form.

11. The three-dimensional, ceramic component according to claim 8, wherein the three-dimensional, ceramic component has a work of fracture of at least 150 Nmm.

12. The three-dimensional, ceramic component according to claim 8, wherein the three-dimensional, ceramic component has a three-point flexural strength of at least 40 MPa.

13. The three-dimensional, ceramic component according to claim 8, wherein the three-dimensional, ceramic component comprises cavities, cooling channels or undercuts and consists overall of a microstructure, which is uniform or which gradually changes according to desired material properties of the three-dimensional, ceramic component.

14. Chemical industry equipment comprising the three-dimensional, ceramic component according to claim 8, wherein the industry equipment is selected from the group consisting of a pump, a microreactor, a macroreactor, pipe lining and a branched pipe.

15. A high-temperature furnace comprising the three-dimensional, ceramic component according to claim 8 as at least one element selected from the group consisting of a burner nozzle, a burner insert, a lining of burner walls, an electrical heating element, and a load-bearing structure.

16. A separator wheel comprising the three-dimensional, ceramic component according to claim 8.

17. A heat exchanger or an element of a heat exchanger comprising the three-dimensional, ceramic component according to claim 8.

18. A mechanically loaded component comprising the three- dimensional, ceramic component according to claim 8, wherein the mechanically loaded component is a sliding bearing, a rotary seal, a gear, a piston or a piston sleeve.

19. A mould and crucible comprising the three-dimensional, ceramic component according to claim 8.

20. A ballistic structure comprising the three-dimensional, ceramic component according to claim 8.

21. A frictional body having cooling comprising the three-dimensional, ceramic component according to claim 8.

22. A precision component comprising the three-dimensional, ceramic component according to claim 8.

* * * * *